(12) United States Patent
Peter

(10) Patent No.: US 6,837,357 B2
(45) Date of Patent: Jan. 4, 2005

(54) DRIVE UNIT FOR ACTUATING A PARKING BRAKE IN A VEHICLE

(75) Inventor: Cornelius Peter, Bühl (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 10/281,609

(22) Filed: Oct. 28, 2002

(65) Prior Publication Data

US 2003/0089576 A1 May 15, 2003

(30) Foreign Application Priority Data

Oct. 31, 2001 (DE) ..................................... 201 17 795 U

(51) Int. Cl.[7] .................................................. B60T 7/10
(52) U.S. Cl. .................. 192/219.4; 192/222; 192/223.1; 188/2 D; 188/31; 188/72.3; 188/157
(58) Field of Search .............. 192/219.4, 223.1, 192/222; 188/2 D, 72.1, 72.3, 156, 157, 158, 151 D, 69, 31; 474/70

(56) References Cited

U.S. PATENT DOCUMENTS

| | | | |
|---|---|---|---|
| 5,810,568 A | * | 9/1998 | Whitefield et al. ...... 417/423.8 |
| 6,193,022 B1 | | 2/2001 | Bode |
| 6,394,235 B1 | * | 5/2002 | Poertzgen et al. ......... 188/72.6 |
| 6,533,082 B2 | * | 3/2003 | Gill et al. ..................... 188/156 |
| 6,550,598 B2 | * | 4/2003 | Drennen ................... 192/219.4 |
| 6,666,305 B1 | * | 12/2003 | Vohla ........................... 188/156 |
| 2002/0066623 A1 | * | 6/2002 | Powrozek .................... 188/2 D |
| 2002/0066626 A1 | * | 6/2002 | Gill et al. ..................... 188/158 |
| 2003/0000795 A1 | * | 1/2003 | Drennan ................... 192/219.4 |
| 2003/0066714 A1 | * | 4/2003 | Flynn et al. ................. 188/2 D |

FOREIGN PATENT DOCUMENTS

| | | |
|---|---|---|
| DE | 2640770 A1 | 3/1978 |
| DE | 3210402 A1 | 9/1983 |
| DE | 197 03 417 A1 | 8/1998 |
| DE | 19818339 C1 | 2/2000 |
| DE | 19945702 A1 | 4/2001 |
| EP | 1 231 119 A2 | 8/2002 |
| GB | 1558283 | 12/1979 |
| WO | WO9015743 | 12/1990 |

* cited by examiner

*Primary Examiner*—Saul Rodriguez
(74) *Attorney, Agent, or Firm*—Tarolli, Sundheim, Covell & Tummion L.L.P.

(57) ABSTRACT

A compact drive unit for actuating parking brakes is provided. The drive unit has a reduction gear that is formed by a two-stage belt drive, in combination with a drive motor that is made up of a brushless direct current motor. The two-stage belt drive preferably consists of two toothed belt drives functionally arranged in series; the direct current motor preferably has an external rotor with a rare-earth magnetic ring.

Figure 1:
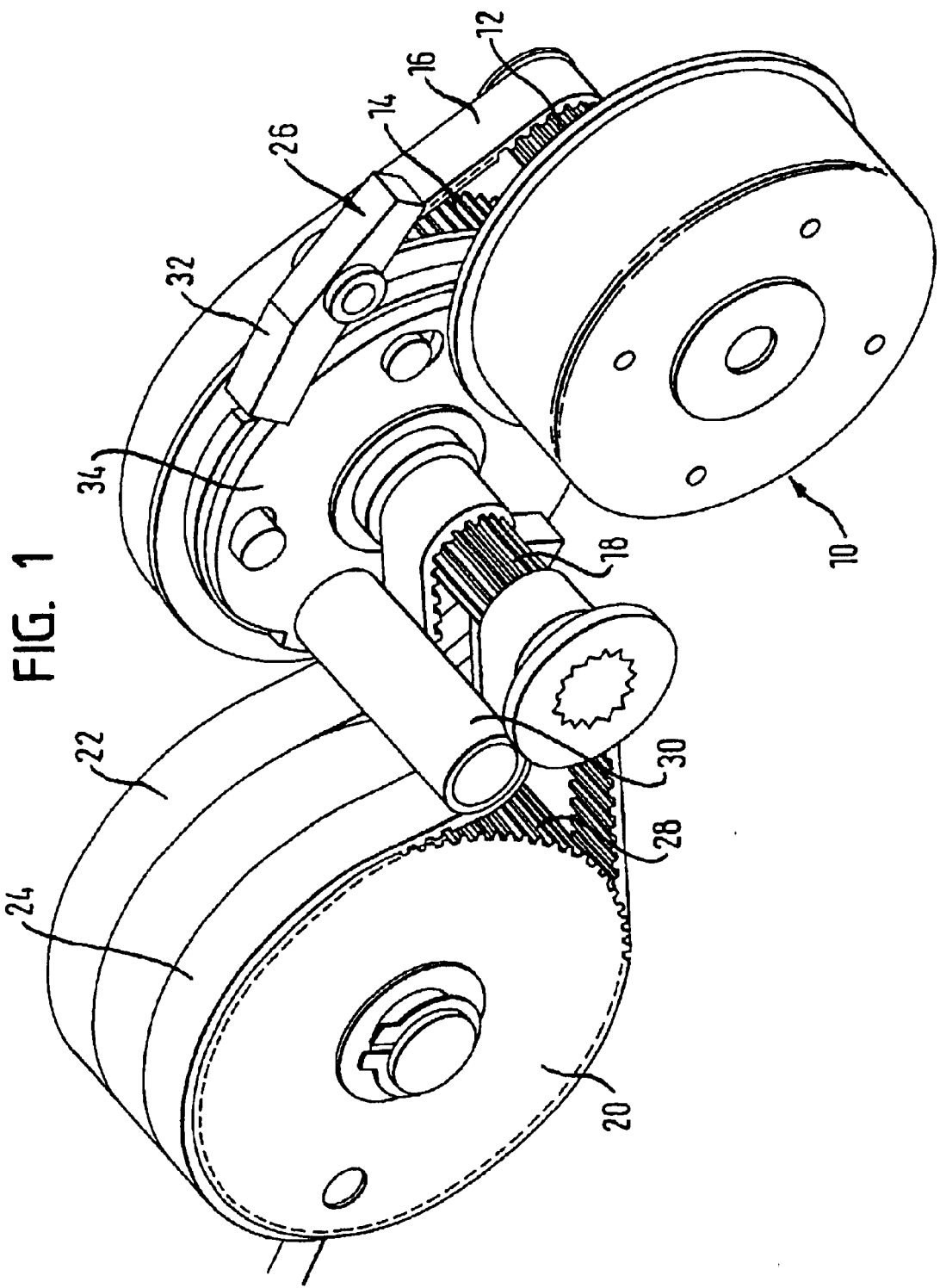

16 Claims, 4 Drawing Sheets

DRIVE UNIT FOR ACTUATING A PARKING BRAKE IN A VEHICLE

FIELD OF THE INVENTION

The invention relates to a drive unit for actuating a parking brake in a vehicle and having an actuating member that is coupled to the brake system. The drive unit has an electric drive motor and a rotatable force-transmission member to which the actuating member is connected. A reduction gear is arranged between the drive motor and the rotatable force-transmission member.

BACKGROUND OF THE INVENTION

In luxury automobiles, such a drive unit replaces the hand or foot actuating means for the parking brake. This drive unit can be used to activate or deactivate the parking brake by means of manual actuation of an electric switch or else automatically, for example, via a tachometer signal or a tilt incline sensor.

SUMMARY OF THE INVENTION

The invention provides a compact drive unit for actuating parking brakes which functions especially quietly with a high efficiency and which carries out the actuation procedure within a very short period of time. The drive unit according to the invention has a reduction gear that is formed by a two-stage belt drive, in combination with a drive motor that is made up of a brushless direct current motor. The two-stage belt drive preferably consists of two toothed belt drives functionally arranged in series, the direct current motor preferably has an external rotor with a rare-earth magnetic ring. The high efficiency of the two-stage belt drive offers the possibility of detecting and regulating the actuation force via the motor current without a separate force sensor. In combination with the high torque of the direct current motor that is used, very short actuation times of less than 0.5 seconds are achieved. This actuation time is sufficiently short to achieve an ABS function for the parking brake in case of emergency situations.

Since the two-stage belt drive is reversible, i.e. it allows a reverse rotation, there is a need for a latching mechanism that maintains the activation state of the parking brake when the drive motor is switched off. In a first embodiment, this latching mechanism is formed in that the first stage of the belt drive has a pulley with at least one latching recess on its circumference with which a spring-loaded ratchet interacts and which latches in the latching recess when the pulley rotates opposite to the drive direction. The ratchet can be disengaged from the latching recess by a cam disk that is coupled to the pulley so that it can rotate to a limited extent. Since the latching mechanism is situated on the first stage of the belt drive, just a few, for example two or three, latching positions distributed over the periphery of the pulley are sufficient to divide a total brake actuation stroke into adequately spaced partial strokes

SHORT DESCRIPTION OF THE DRAWINGS

Figure 2:
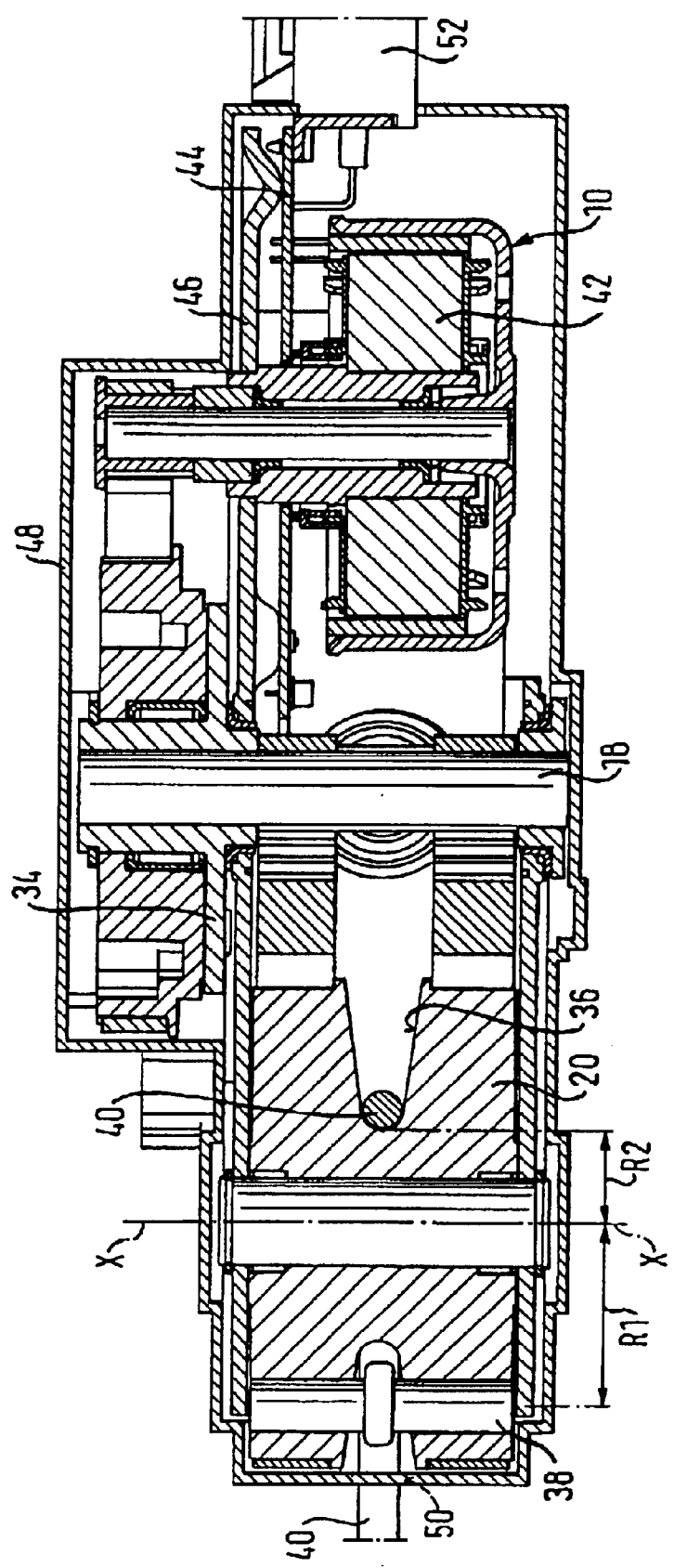
Figure 3:
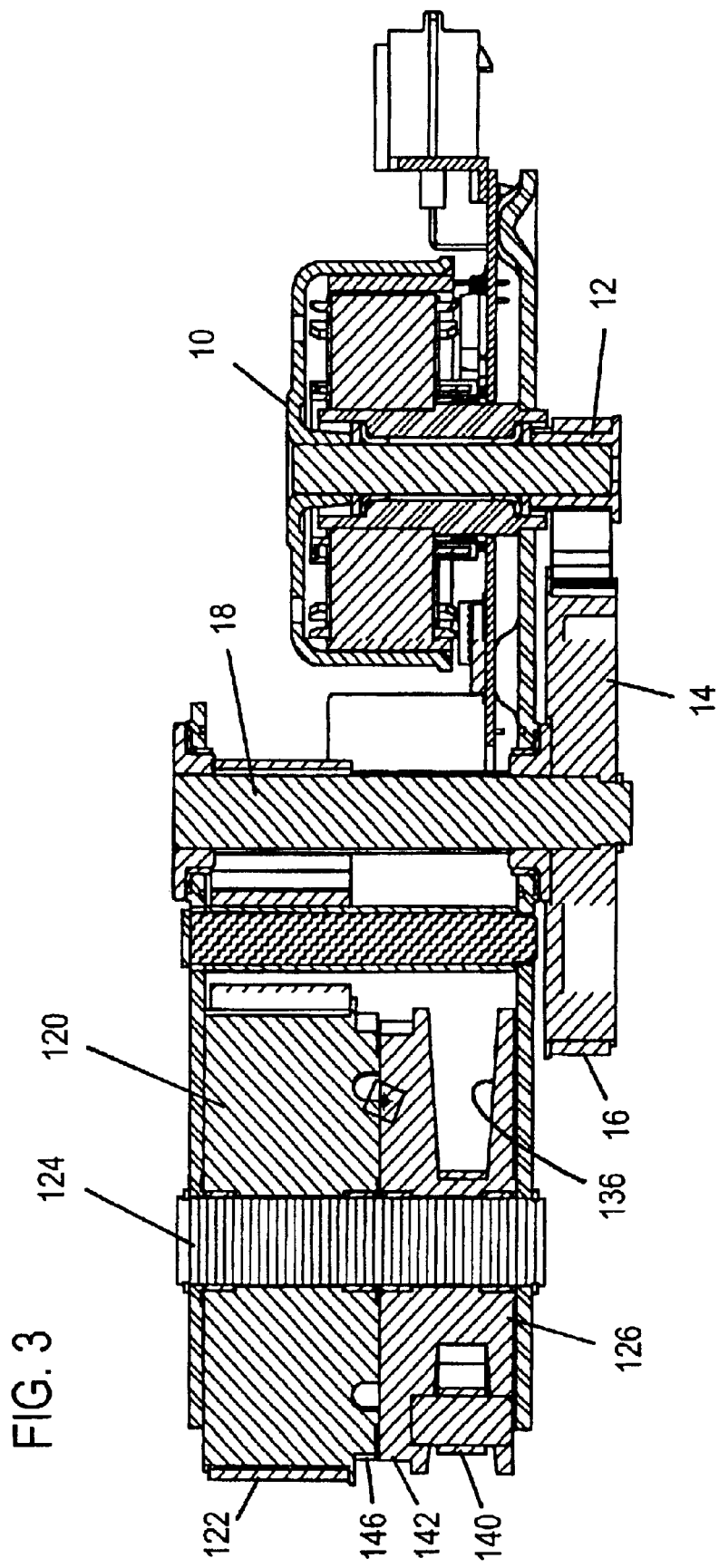
Figure 4:
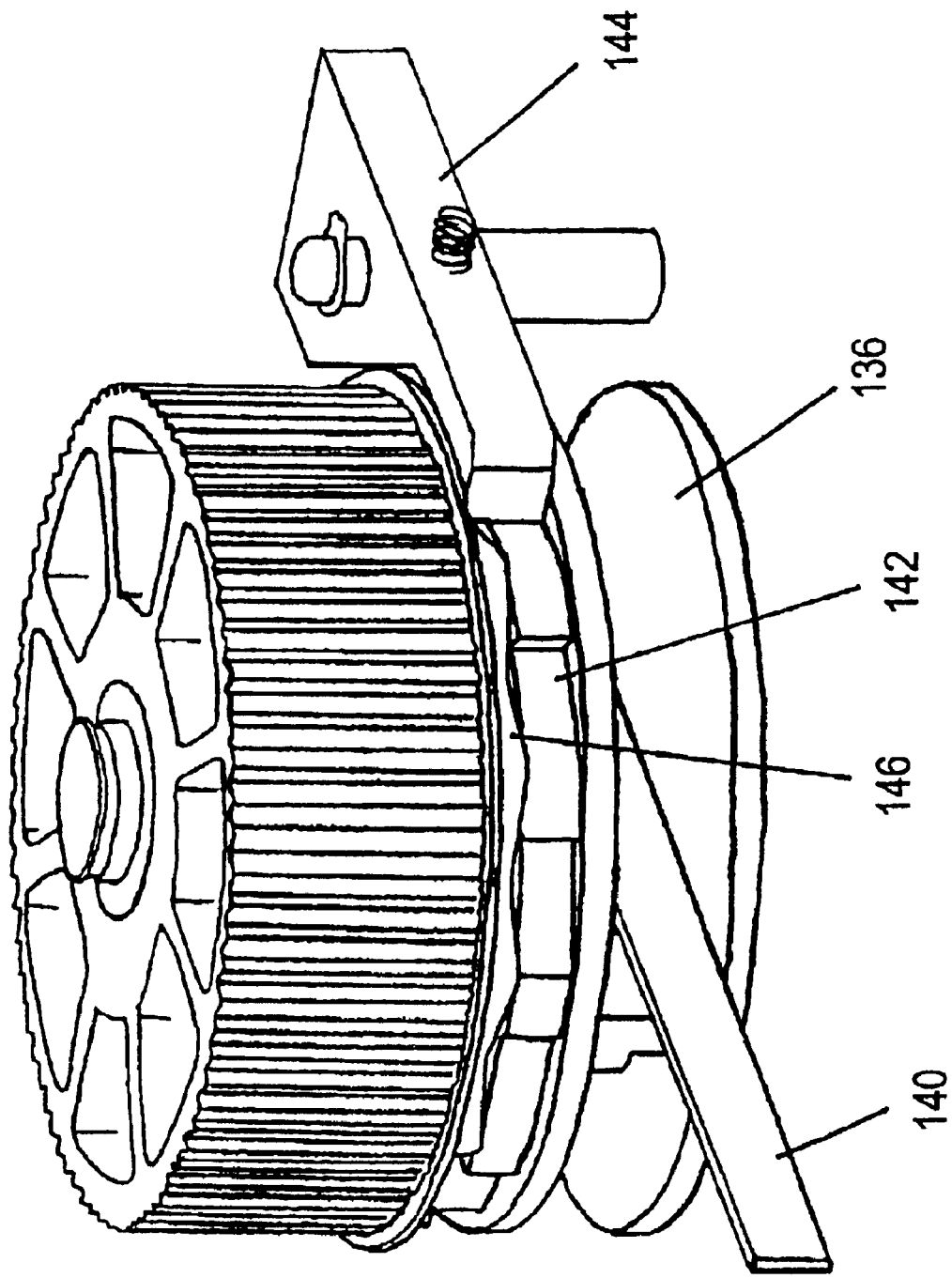

Additional characteristics and advantages of the invention ensue from the description below of a preferred embodiment and from the accompanying drawings. The drawings show the following:

FIG. 1 a perspective view of the most important functional parts of the drive unit according to a first embodiment;

FIG. 2 a sectional view of the drive unit;

FIG. 3 a perspective partial view of the drive unit according to a second embodiment; and FIG. 4 a sectional view of the embodiment shown in FIG. 3.

DETAILED DESCRIPTION OF THE PREFERRED EMBODIMENTS

Functional parts of a drive unit for parking brakes in vehicles as shown in FIG. 1 comprise a brushless direct current motor 10 with an external rotor, a reduction gear configured as a two-stage belt drive whose first stage consists of a pinion 12 connected to the external rotor of the direct current motor, a belt pulley 14 and a toothed belt 16, and whose second stage consists of a pinion shaft 18 connected to the belt pulley 14, a drum 20 and two parallel toothed belts 22, 24, and a latching mechanism 26 that is situated on the belt pulley 14. The axial ends of the drum have two toothed rings 28 that are shaped into the peripheral surface at an axial distance from each other and on which the toothed belts 22, 24 run. The toothed belts 22, 24 are tightened around the drum 20 and the pinion shaft 18 by means of a shared, adjustable tension roller 30. The axes of the direct current motor 10, of the belt pulley 14 and of the pinion shaft 18, which is coaxial thereto, as well as the drum are parallel; they can also lie in one shared plane.

The reduction gear made up of the two-stage belt drive has an efficiency of over 80%. The brushless direct current motor 10, whose rotor configured as an external rotor is equipped with a neodymium magnetic ring, develops a high starting torque of, for example, up to 2 Nm. This combination enables the drive unit to achieve extremely short actuation times in the range of less than one-half second.

The latching mechanism 26 consists of two ratchets 32 that are situated diametrically opposed on the circumference of the belt pulley 14—one of said ratchets 32 being shown in FIG. 1—and of corresponding latching recesses that have been left open on the outer circumference of the belt pulley 14. The ratchets 32 are prestressed by suitable springs into the engaged position. A cam disk 34 is coupled to the belt pulley 14 so that it can rotate to a limited extent. On the outer circumference of the cam disk 34, it has control cams on which the ratchet tips of the ratchets 32 slide which, at the same time, slide over the outer circumference of the belt pulley 14 that has been provided with the latching recesses.

The drum 20 has a cable groove 36 (see FIG. 2) in its peripheral surface between the toothed rings 28. The cable groove 36 has a depth that is variable over the circumference, relative to the axis X—X of the drum. In the cable groove 36, on the largest radius R1 relative to the axis X—X, a traction cable 40 is connected by means of a pin 38 that passes axially through the drum 20. The traction cable 40 forms the actuation element of the parking brake of the vehicle. The side view in FIG. 2 shows the traction cable 40 diametrically opposed to the radius R1 on a smaller radius R2 of the cable groove 36.

The stator 42 of the direct current motor 10 is mounted on a printed circuit board 44 that also carries the electronic components of the control circuit of the direct current motor. The printed circuit board 44 is supported on a bearing plate 46 on which the bearings of the direct current motor 10, of the pinion shaft 18 and of the drum 20 are arranged. The described functional parts of the drive unit are accommodated in a housing 48 that has an outlet opening 50 for the traction cable 40 and a plug base 52 for a connector plug.

In order to activate the parking brake, the direct current motor 10 is put into operation by manually actuating a switch provided in the vehicle for this purpose or by an automated function, as a result of which the drum 20 is rotated in the drive direction by means of the two-stage belt drive. Due to the larger radius R1 of the cable groove, at the beginning, a relatively large actuation path is traversed with a reduced actuation force; towards the end of the actuation path, the smaller radius<R2 of the cable groove becomes active, so that the actuation force is correspondingly larger and the actuation path is smaller. The latching recesses on the circumference of the toothed belt drive are configured in such a way that, together with the ratchets 32, they form an anti-reverse lock that only allows rotation in the drive direction. The detection of the current consumed by the direct current motor 10 provides a criterion for the actuation force exerted on the traction cable 40 via the reduction gear. Once the necessary actuation force of, for example, 1000 N to 2500 N is reached after less than 0.5 seconds, the direct current motor 10 is switched off. Due to the tensile stress now present in the traction cable 40, the drum 20 and with it the belt pulley 14—via the toothed belts 22, 24 and the pinion shaft 18—are also made to rotate opposite from the drive direction, until the ratchets 32 latch in the next latching recess of the belt pulley 14. In this state, the parking brake remains activated until, after a brief operation of the direct current motor 10, it is released opposite from the normal drive direction.

In order to release the parking brake, the direct current motor 10 is briefly activated opposite from the normal drive direction. Through the control cam on the circumference of the cam disk 34, the ratchets 32 are lifted out of the corresponding latching recesses of the belt pulley 14, so that the latter can now rotate freely. Through the sustained tensile stress in the traction cable 40, the drum 20 is now turned back into its starting position, which corresponds to that of the non-actuated parking brake. In this process, the direct current motor 10 is pulled along via the two-stage belt drive, as a result of which the return of the parking brake to the deactivated state is dampened so as to reduce noise.

The embodiment of the drive unit shown in FIGS. 3 and 4 is generally similar to that of FIGS. 1 and 2 in that is also has a brushless dc motor 10 and a two-step belt transmission with a pinion 12, a belt pulley 14, a toothed belt 16, a pinion shaft 18 and a drum 120, the latter being configured for a single toothed belt 122 of an increased width. Drum 120 is mounted on a shaft 124 which also mounts a pulley 126 coaxially with and axially adjacent to drum 120. Drum 120 and pulley 126 are connected for joint rotation, but a limited relative rotation is possible therebetween. Just as drum 20 in the preceding embodiment, pulley 126 has a cable groove 136 with a variable radius for connection of a brake cable 140 in a circumferential position of greatest radius.

Pulley 126 has an outer periphery with ratchet teeth 142. A spring loaded ratchet pawl 144 is pivotally mounted in a frame for cooperation with ratchet teeth 142. Adjacent ratchet teeth 142, drum 120 has a peripheral cam structure 146 and ratchet pawl 144 axially spans both the ratchet teeth 142 and cam structure 146. The geometry of the ratchet teeth 142 is such that drum 120 is allowed to rotate to wind up brake cable 140 when motor 10 rotates in a normal drive direction, but to block rotation of drum 120 in an opposite direction, thereby holding the parking brake in an activated state. To release the parking brake, motor 10 is shortly activated in a sense opposite to the normal drive direction to rotate drum 120 slightly relative to blocked pulley 126. The peripheral cam structure 146 now urges ratchet pawl 144 out of engagement with ratchet teeth 142 to release pulley 126 from the blocked condition. The park brake is now free to return to a released condition.

What is claimed is:

1. A drive unit for actuating a parking brake in a vehicle, the drive unit comprising an actuating member that is coupled to a vehicle brake system, an electric drive motor, a rotatable force-transmission member to which the actuating member is connected and a reduction gear that is functionally arranged between the drive motor and the rotatable force-transmission member, wherein the reduction gear is formed by a two-stage belt drive and the drive motor is formed by a brushless direct current motor, the rotatable force-transmission member being configured to exert a tensile stress onto the actuating member for actuating the parking brake and wherein, due to the tensile stress, the rotatable force-transmission member is moved to release the parking brake.

2. The drive unit according to claim 1, wherein at least the second stage of the belt drive consists of a toothed belt drive.

3. The drive unit according to claim 1, wherein each stage of the belt drive consists of a toothed belt drive.

4. The drive unit according to claim 1, wherein the direct current motor has an external rotor with a rare-earth magnetic ring.

5. The drive unit according to claim 1, wherein the direct current motor has a stator that is mounted on a printed circuit board with electronic control components.

6. The drive unit according to claim 1, wherein the rotatable force-transmission member is a drum with a toothed peripheral surface, a pulley is coupled coaxially with the drum for joint rotation, the pulley having a peripheral cable groove with a variable radius relative to the axis of the pulley, and a traction cable is connected in the cable groove at one end and with the brake system at the other end.

7. The drive unit of claim 6, wherein the traction cable is connected in the cable groove at a circumferential angle of greatest radius.

8. The drive unit of claim 7, wherein the pulley is provided with a peripheral latching toothing for cooperation with a latching pawl pivotally mounted in a fixed frame which also mounts the pulley and the drum, the latching pawl being spring biased to a position engaged in the latching toothing.

9. The drive unit of claim 8, wherein the drum has a peripheral cam structure adjacent the latching toothing of the pulley, the latching pawl axially spanning both of the latching toothing and the cam structure, the drum and pulley being connected for a limited relative rotation, so that the latching pawl, when the drum rotates in a direction opposite a normal drive direction, is forcibly moved to a disengaged position by the can structure.

10. A drive unit for actuating a parking brake in a vehicle, the drive unit comprising an actuating member that is coupled to a vehicle brake system, an electric drive motor, a rotatable force-transmission member to which the actuating member is connected and a reduction gear that is functionally arranged between the drive motor and the rotatable force-transmission member, wherein the reduction gear is formed by a two-stage belt drive and the drive motor is formed by a brushless direct current motor, and wherein a second belt drive has a pair of toothed belts arranged in parallel.

11. The drive unit according to claim 10, wherein the rotatable force-transmission member is formed by a drum into whose peripheral surface two toothed rings are shaped at an axial distance from each other.

12. A drive unit for actuating a parking brake in a vehicle, the drive unit comprising an actuating member that is coupled to a vehicle brake system, an electric drive motor, a rotatable force-transmission member to which the actuating member is connected and a reduction gear that is functionally arranged between the drive motor and the rotatable force-transmission member, wherein the reduction gear is formed by a two-stage belt drive and the drive motor is formed by a brushless direct current motor, and wherein the rotatable force-transmission member consists of a cylindrical drum in whose circumference a cable groove is formed whose radius relative to the axis of the drum is variable, and the actuation element is a traction cable that is connected in the cable groove.

13. The drive unit according to claim 12, wherein the traction cable is connected at the circumferential angle of the cable groove with the largest radius.

14. A drive unit for actuating a parking brake in a vehicle, the drive unit comprising an actuating member that is coupled to a vehicle brake system, an electric drive motor, a rotatable force-transmission member to which the actuating member is connected and a reduction gear that is functionally arranged between the drive motor and the rotatable force-transmission member, wherein the reduction gear is formed by a two-stage belt drive and the drive motor is formed by a brushless direct current motor, and wherein the first stage of the belt drive includes a pulley rotatably mounted in a frame and having at least one latching recess on its circumference and a spring-loaded ratchet pivotally mounted in the frame and biased to a latching position engaged in said recess when the belt drive rotates opposite to a drive direction.

15. The drive unit according to claim 14, wherein the ratchet is disengaged from the latching recess by a cam disk that is coupled to the pulley for limited relative rotation.

16. A drive unit for actuating a parking brake in a vehicle, the drive unit comprising an actuating member that is coupled to a vehicle brake system, an electric drive motor, a rotatable force-transmission member to which the actuating member is connected and a reduction gear that is functionally arranged between the drive motor and the rotatable force-transmission member, wherein the reduction gear is formed by a two-stage belt drive and the drive motor is formed by a brushless direct current motor, the rotatable force-transmission member being configured to exert a first force on the actuating member for actuating the parking brake, the rotatable force-transmission member being configured to receive a second force, opposite the first force, from the actuating member to rotate the force-transmission member to release the parking brake.

* * * * *

UNITED STATES PATENT AND TRADEMARK OFFICE
CERTIFICATE OF CORRECTION

PATENT NO.     : 6,837,357 B2
DATED          : January 4, 2005
INVENTOR(S)    : Cornelius Peter It is certified that error appears in the above-identified patent and that said Letters Patent is hereby corrected as shown below:

<u>Column 4,</u>
Line 49, before "structure" change "can" to -- cam --.

Signed and Sealed this

Thirty-first Day of May, 2005

JON W. DUDAS
*Director of the United States Patent and Trademark Office*